United States Patent
Childs (10) Patent No.: US 12,089,536 B2
(45) Date of Patent: Sep. 17, 2024

(54) AGRICULTURAL VEHICLE WITH RETAINER FOR BLOCKAGE REMOVING WINDGUARD

(71) Applicant: CNH Industrial America LLC, New Holland, PA (US)

(72) Inventor: Albert Childs, Denver, PA (US)

(73) Assignee: CNH Industrial America LLC, New Holland, PA (US)

(*) Notice: Subject to any disclaimer, the term of this patent is extended or adjusted under 35 U.S.C. 154(b) by 418 days.

(21) Appl. No.: 17/324,469

(22) Filed: May 19, 2021

(65) Prior Publication Data

US 2021/0360859 A1 Nov. 25, 2021

Related U.S. Application Data

(60) Provisional application No. 63/027,122, filed on May 19, 2020.

(51) Int. Cl.
| | | |
|---|---|---|
| *A01F 15/10* | (2006.01) | |
| *A01D 89/00* | (2006.01) | |
| *A01F 15/07* | (2006.01) | |

(52) U.S. Cl.
CPC .......... *A01F 15/106* (2013.01); *A01D 89/008* (2013.01); *A01F 15/07* (2013.01); *A01F 2015/107* (2013.01)

(58) Field of Classification Search
CPC ..... A01D 89/007; A01D 89/008; A01F 21/00; A01F 15/07; A01F 15/10; A01F 2015/107
See application file for complete search history.

(56) References Cited

U.S. PATENT DOCUMENTS 5,131,214 A * 7/1992 Vermeer ............. A01F 15/0833
100/88
6,134,868 A 10/2000 Schmiticke
(Continued)

FOREIGN PATENT DOCUMENTS

| AU | 2006202452 A1 * | 1/2007 | ........... A01D 89/008 |
| DE | 102012011591 A1 * | 12/2013 | ........... A01D 89/008 |

(Continued)

OTHER PUBLICATIONS

EP_1252813_A1—English translated claims, Oct. 30, 2002.*
Extended European Search Report for EP application 21174859.5, mailed Oct. 19, 2021 (8 pages).

*Primary Examiner* — Thomas B Will
*Assistant Examiner* — Julia C Tran
(74) *Attorney, Agent, or Firm* — Peter K. Zacharias; Rebecca L. Henkel; Rickard K. DeMille (57) ABSTRACT

A feeding assembly for an agricultural vehicle includes: a pickup including a pickup reel carrying a plurality of tines; a rotor including a plurality of rotor fins disposed rearwardly from the pickup; a windguard assembly including a pair of movable support arms and a windguard coupled to the support arms, the windguard including a tube and a plurality of windguard tines coupled to the tube, the windguard being movable from a first position to a second position that is elevated relative to the first position; and a windguard retainer configured to engage the windguard when the windguard is in the second position and retain the windguard in the second position.

21 Claims, 4 Drawing Sheets

(56) References Cited

U.S. PATENT DOCUMENTS

| | | | |
|---|---|---|---|
| 6,295,797 B1 * | 10/2001 | Naaktgeboren | A01D 89/008 56/364 |
| 6,679,042 B1 * | 1/2004 | Schrag | A01F 15/10 56/341 |
| 7,730,704 B2 | 6/2010 | Viaud | |
| 7,861,506 B2 | 1/2011 | Humbert | |
| 9,192,102 B2 * | 11/2015 | Gantzer | A01D 89/008 |
| 9,253,948 B2 * | 2/2016 | Olander | A01F 15/106 |
| 9,521,807 B2 * | 12/2016 | Ubaldi | A01D 89/008 |
| 10,111,387 B1 * | 10/2018 | Derscheid | A01D 89/008 |
| 2003/0182921 A1 * | 10/2003 | McClure | A01D 89/008 56/341 |
| 2008/0141642 A1 * | 6/2008 | Viaud | A01F 15/106 56/344 |
| 2008/0163600 A1 * | 7/2008 | Schrag | A01D 89/008 56/341 |
| 2010/0043370 A1 * | 2/2010 | Viaud | A01D 89/008 56/341 |
| 2013/0104512 A1 * | 5/2013 | Duenwald | A01F 15/10 56/341 |
| 2014/0026533 A1 * | 1/2014 | Choluj | A01D 89/008 56/344 |
| 2014/0123617 A1 * | 5/2014 | Dumarey | A01D 89/008 56/379 |
| 2014/0250855 A1 | 9/2014 | Vandamme et al. | |
| 2021/0274716 A1 * | 9/2021 | Lammerant | A01D 89/008 |
| 2022/0408653 A1 * | 12/2022 | Childs | A01D 89/002 |

FOREIGN PATENT DOCUMENTS

| | | | | |
|---|---|---|---|---|
| DE | 202018107313 U1 | 4/2020 | | |
| EP | 1252813 A1 | 10/2002 | | |
| EP | 1738634 A1 * | 1/2007 | | A01D 61/008 |
| EP | 1932419 A1 * | 6/2008 | | A01D 89/008 |
| EP | 2777379 A1 | 9/2014 | | |
| EP | 2777383 A1 * | 9/2014 | | A01F 15/0833 |
| EP | 4066623 A1 * | 10/2022 | | A01D 89/008 |
| FR | 2776469 A1 * | 10/1999 | | A01D 61/008 |
| FR | 2898243 A1 * | 9/2007 | | A01D 89/008 |
| WO | WO-2012136515 A1 * | 10/2012 | | A01D 89/002 |
| WO | WO-2013053682 A1 * | 4/2013 | | A01D 89/002 |

* cited by examiner

AGRICULTURAL VEHICLE WITH RETAINER FOR BLOCKAGE REMOVING WINDGUARD

BACKGROUND OF THE INVENTION

The present invention pertains to agricultural vehicles and, more specifically, to agricultural vehicles that include a windguard.

Agricultural harvesting machines, such as balers, are used to consolidate and package crop material so as to facilitate the storage and handling of the crop material for later use. In the case of hay, a mower-conditioner is typically used to cut and condition the crop material for windrow drying in the sun. In the case of straw, an agricultural combine discharges non-grain crop material from the rear of the combine defining the straw (such as wheat or oat straw) which is to be picked up by the baler. The cut crop material is typically raked and dried, and a baler, such as a large square baler or round baler, straddles the windrows and travels along the windrows to pick up the crop material and form it into bales.

A round baler may generally include a chassis, supported by wheels, a pickup unit to engage and lift the crop material into the baler, a cutting unit, a main bale chamber for forming a bale, and a wrapping mechanism for wrapping or tying a material around the bale after it has been formed in the main bale chamber. As the baler is towed over a windrow, the pickup unit lifts the crop material into the baler. Then, the crop material may be cut into smaller pieces by the cutting unit. Many balers include a windguard, which holds down crop material as it is being fed to prevent it from being blown off the pickup floor and ensure adequate compaction of the crop material for appropriate feeding into the vehicle. As the crop material enters the main bale chamber, multiple carrier elements, e.g. rollers, chains and slats, and/or belts, will begin to roll a bale of hay within the chamber. These carrier elements are movable so that the chamber can initially contract and subsequently expand to maintain an appropriate amount of pressure on the periphery of the bale. After the bale is formed and wrapped by the wrapping mechanism, the rear of the baler is configured to open for allowing the bale to be discharged onto the field.

In certain instances, compacted crop material may not be properly conveyed and form a blockage. The formed blockage interferes with crop material movement and, if severe enough, needs to be removed before resuming crop material collection. Thus, crop material blockages can detrimentally affect operation of the agricultural vehicle.

What is needed in the art is a way to reduce the risk of crop material blockages detrimentally affecting operation of an agricultural vehicle.

SUMMARY OF THE INVENTION

Exemplary embodiments provided according to the present disclosure include a feeding assembly with a windguard retainer that is configured to engage a windguard when the windguard is in an elevated second position and retain the windguard in the second position.

In some exemplary embodiments provided in accordance with the present disclosure, a feeding assembly for an agricultural vehicle includes: a pickup including a pickup reel carrying a plurality of tines; a rotor including a plurality of rotor fins disposed rearwardly from the pickup; a windguard assembly including a pair of movable support arms and a windguard coupled to the support arms, the windguard including a tube and a plurality of windguard tines coupled to the tube, the windguard being movable from a first position to a second position that is elevated relative to the first position; and a windguard retainer configured to engage the windguard when the windguard is in the second position and retain the windguard in the second position.

In some exemplary embodiments provided in accordance with the present disclosure, an agricultural vehicle includes: a chassis; a pickup carried by the chassis and including a pickup reel carrying a plurality of tines; a rotor including a plurality of rotor fins disposed rearwardly from the pickup; a windguard assembly including a pair of movable support arms and a windguard coupled to the support arms, the windguard including a tube and a plurality of windguard tines coupled to the tube, the windguard being movable from a first position to a second position that is elevated relative to the first position; and a windguard retainer configured to engage the windguard when the windguard is in the second position and retain the windguard in the second position.

One possible advantage that may be realized by exemplary embodiments provided according to the present disclosure is that windguard retainer can retain the windguard in the second position to make it easier to remove a crop material blockage in an area around the pickup.

Another possible advantage that may be realized by exemplary embodiments provided according to the present disclosure is that the windguard tines may be moved while the windguard is retained in the second position, without moving the entirety of the windguard, in order to remove a crop material blockage.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown. Like numerals indicate like elements throughout the drawings. In the drawings.

DETAILED DESCRIPTION OF THE INVENTION

The terms "forward", "rearward", "left" and "right", when used in connection with the agricultural baler and/or components thereof are usually determined with reference to the direction of forward operative travel of the towing vehicle, but they should not be construed as limiting. The terms "longitudinal" and "transverse" are determined with reference to the fore-and-aft direction of the towing vehicle and are equally not to be construed as limiting.

Figure 1:
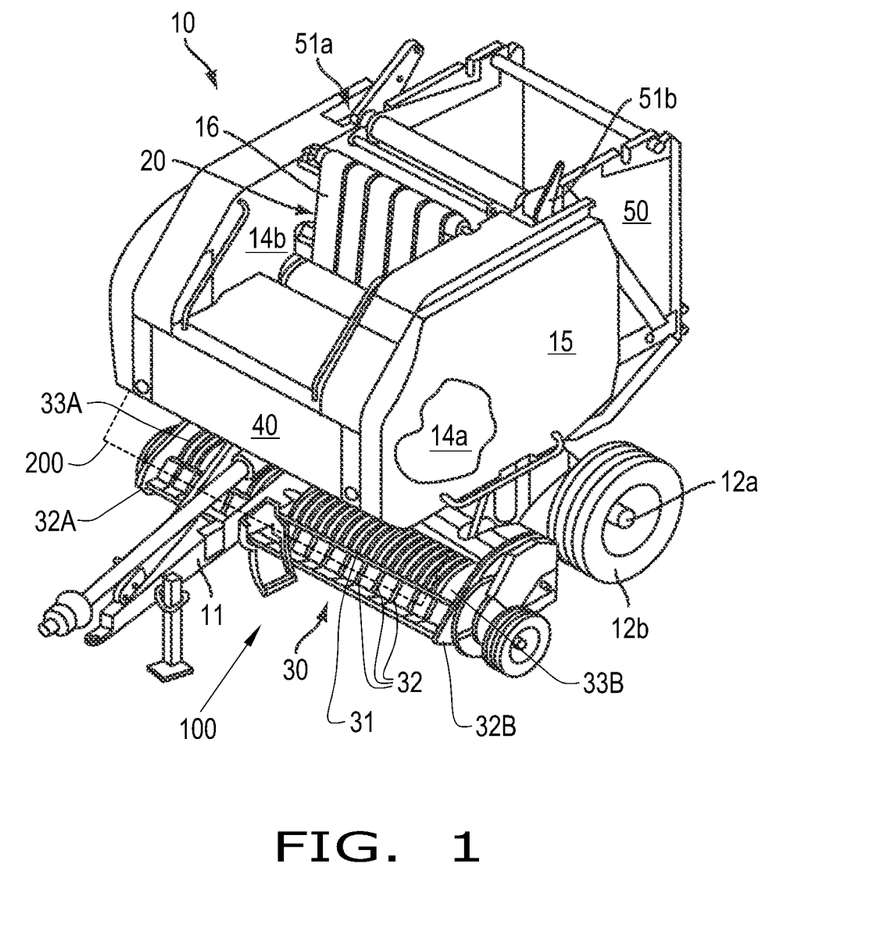
FIG. 1 illustrates a perspective view of an exemplary embodiment of an agricultural vehicle including a feeding assembly including a windguard assembly, provided in accordance with the present disclosure.

Referring now to the drawings, and more particularly to FIG. 1, an exemplary embodiment of an agricultural vehicle 10 in the form of a round baler is shown to include a chassis terminating forwardly in a tongue 11 and rearward slightly beyond a transverse axle 12a to which a pair of wheels 12b (only one shown) is mounted, thus forming a wheel supported chassis. The chassis supports a series of belts 16 and floor rolls, which together with a first sidewall 14a (shown in the breakout) behind and generally parallel to cover panel 15 and a second sidewall 14b, collectively forming a bale chamber 20. Cut crop material is picked up by a pickup 30 and fed through a harvesting assembly into the bale chamber 20 where it is formed into a cylindrically shaped bale by a series of conveyor belts 16. The pickup 30 is carried by the chassis and includes a transverse pickup reel 31 and a plurality of tines 32 carried by the pickup reel 31. The bale is then optionally wrapped with twine or a net wrapping material dispensed from a wrapping mechanism generally behind shield 40. Upon completion of the optional wrapping process, the tailgate 50 pivots upwardly about pivot points 51a, 51b and the bale is discharged onto the ground. It should be appreciated that while the agricultural vehicle 10 is illustrated and described as a round baler, in some embodiments the agricultural vehicle 10 is configured as a different type of baler, such as a large square baler, or a different type of vehicle altogether, such as a forage harvester.

Figure 2:
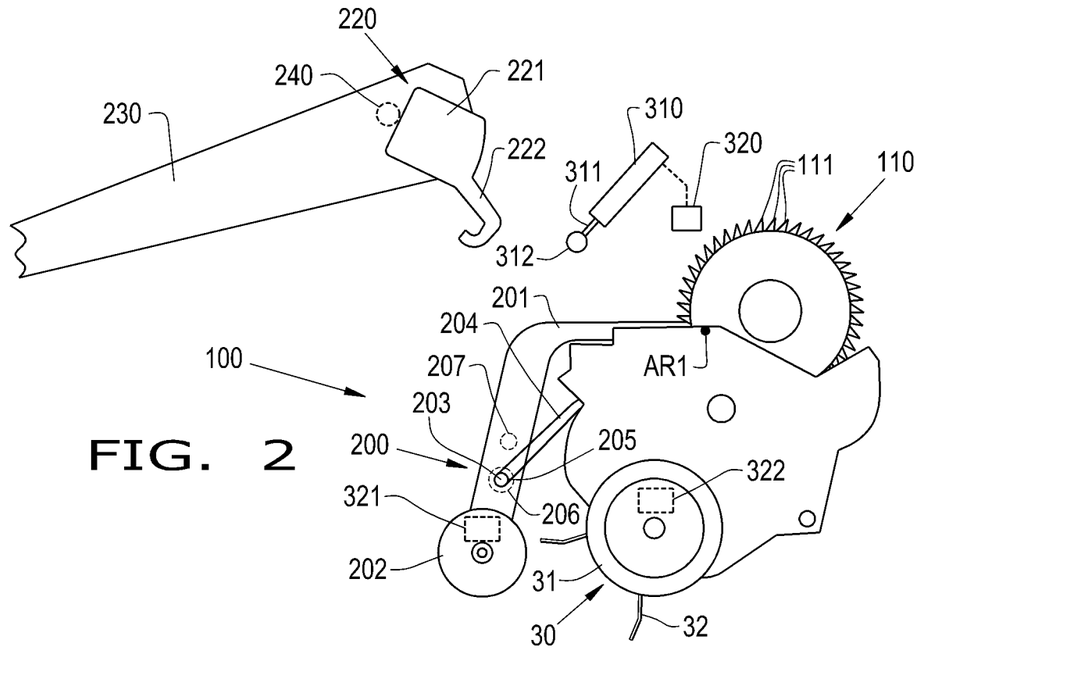
FIG. 2 illustrates a side view of the feeding assembly of FIG. 1 when a windguard of the windguard assembly is in a first position.

With further reference to FIG. 1, and referring now to FIG. 2 as well, it is illustrated how the agricultural vehicle 10 includes a feeding assembly 100 including the previously described pickup 30, a rotor 110 having rotor fins 111 disposed rearwardly from the pickup 30, and a windguard assembly 200. The windguard assembly 200 includes a pair of movable support arms 201 (with only one illustrated in FIG. 2), which may be pivotably coupled to the chassis of the vehicle 10, and a windguard 202 coupled to the support arms 201. As is known, the windguard 202 includes a tube 203 and a plurality of windguard tines 204 that are coupled to the tube 203. The windguard 202 may be moved, such as pivoted, by the support arms 201 between various positions, as is known. As illustrated in FIG. 2, the windguard 202 may be moved, e.g., pivoted, from a first position to a second position that is elevated relative to the first position. In some embodiments, the second position is a fully raised position of the windguard 202. In the illustrated embodiment, the windguard 202 is pivoted by the support arms 201 about a first axis of rotation AR1, but it should be appreciated that the windguard 202 may be moved between the first position and the second position in a variety of ways. Thus, the windguard 202 can be moved to various positions to hold down and compact crop material as it is collected by the pickup 30.

In known agricultural vehicles, such as balers, there are sometimes instances where crop material being collected by the pickup forms a blockage at the pickup. If the blockage becomes too large, collection by the pickup is significantly disrupted. An operator must stop operation of the vehicle and clear the blockage, which creates downtime of the vehicle and can be dangerous if the operator must manually clear the blockage. To address the risk of operator injury while clearing blockages, there have been proposals for safety regulations aimed at preventing the operator from manually clearing crop material blockages. Further, the windguard being in a lowered position, such as a harvesting position, can impede removal of a blockage from the pickup area.

Figure 3:
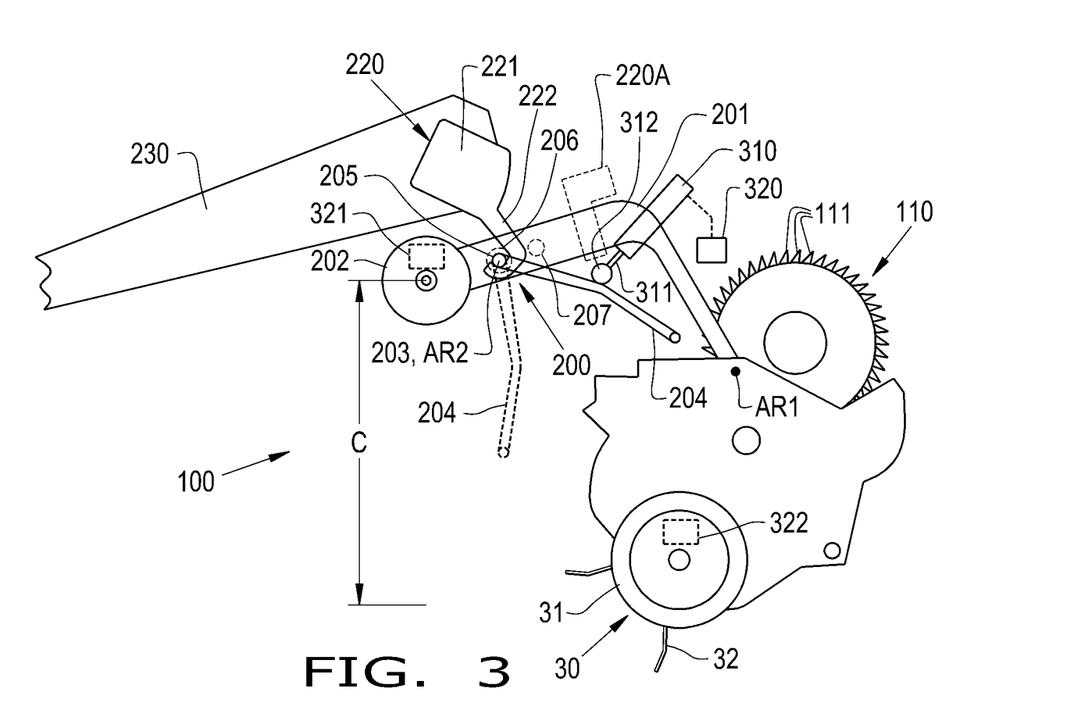
FIG. 3 illustrates a side view of the feeding assembly of FIGS. 1-2 when the windguard is retained in a second position by a windguard retainer.
Figure 4:
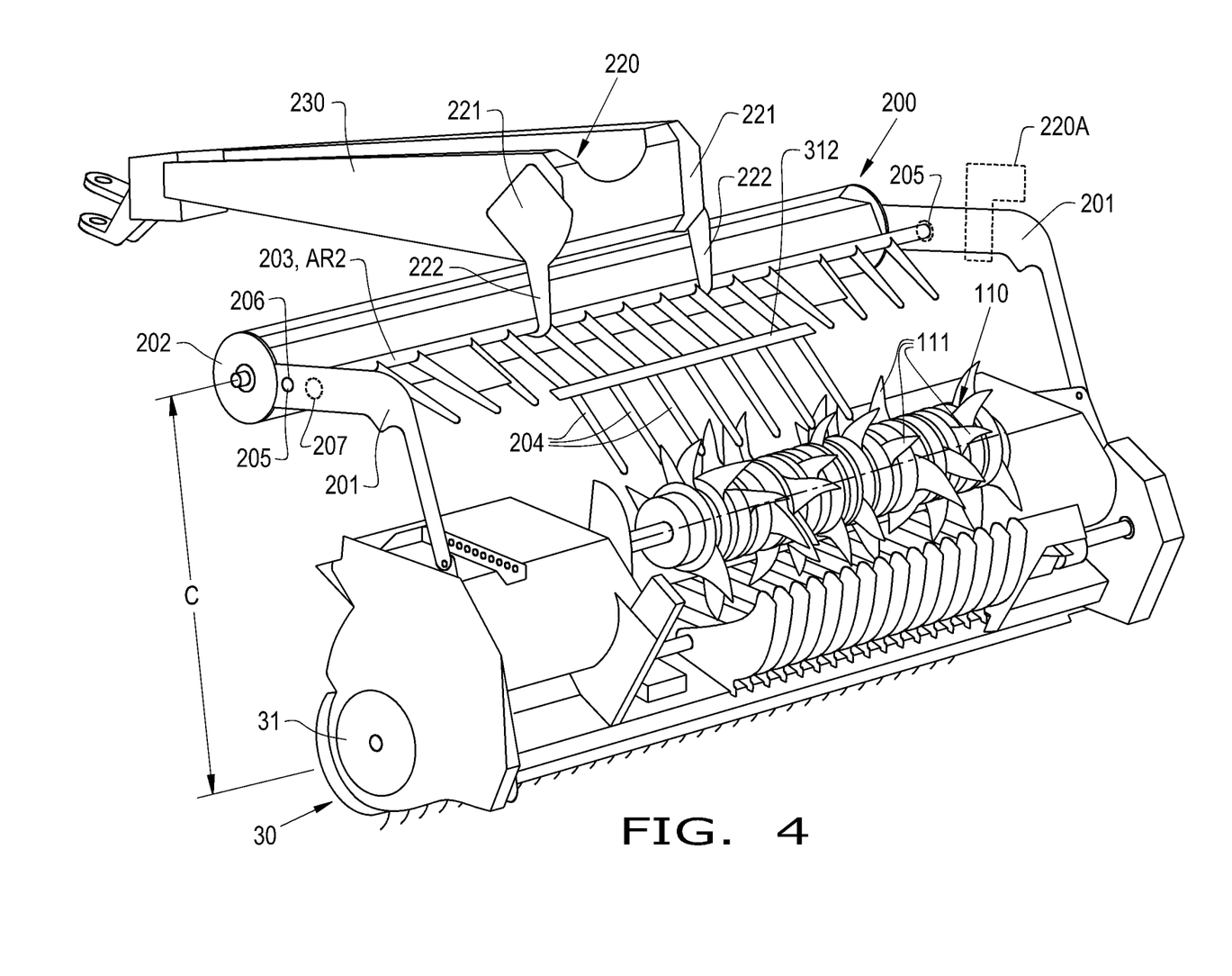
FIG. 4 illustrates a perspective view of the feeding assembly of FIGS. 1-3 when the windguard is retained in the second position by the windguard retainer.

To address some of the previously described issues with known agricultural vehicles, and referring now to FIGS. 3 and 4 as well, the feeding assembly 100 provided according to the present disclosure includes a windguard retainer 220 that is configured to engage the windguard 202 when the windguard 202 is elevated to the second position and retain the windguard 202 in the second position. As illustrated, the windguard retainer 220 is coupled to a frame 230 of the vehicle 10 and may include a base portion 221 with at least one hook 222, illustrated as two hooks, that is placed, or may be placed, in the movement path of the windguard 202 to the second position. When the windguard 202 is in the second position, the windguard 202 may engage the hooks 222, which retain the windguard 202 in place. For example, the tube 203 of the windguard 202 may be engaged by the hooks 222 so the hooks 222 retain the windguard 202 in the second position via the tube 203. While the windguard retainer 220 is illustrated and described as including hooks 222 to engage and retain the windguard 202 in the second position, the windguard retainer 220 may be configured in other ways to engage and retain the windguard 202 in the second position, e.g., by including a slot that captures a portion of the windguard 202. Further, while the windguard retainer 220 is illustrated as engaging the tube 203 of the windguard 202 to retain the windguard 202 in the second position, in some embodiments a windguard retainer 220A (illustrated in dashed lines) is provided, alternatively or additionally to the windguard retainer 220, that is configured to engage at least one of the support arms 201 when the windguard 202 is in the second position to retain the windguard 202 in the second position. It should thus be appreciated that the windguard 202 may be retained by one or more windguard retainers 220, 220A in a variety of ways according to the present disclosure.

In some embodiments, and referring specifically now to FIGS. 3 and 4, the support arms 201 are pivotable about the first axis of rotation AR1 to pivot the entirety of the windguard 202 between the first position and the second position, as previously described. The windguard tines 204 may be configured to move, such as pivot, without moving the entirety of the windguard 202 while the windguard 202 is in the second position to, for example, dislodge and remove a crop material blockage that has developed in an area around the pickup 30. For example, the windguard tines 204 may be configured to be pivoted toward and/or away from the pickup 30, e.g., downwardly and/or upwardly, to dislodge the crop material blockage. The windguard tines 204 may be pivotable about a second axis of rotation AR2, illustrated as being defined by the tube 203, that is non-coaxial with the first axis of rotation AR1. FIG. 3 illustrates the windguard tines 204 in an unpivoted position (illustrated in solid lines) and a pivoted position (illustrated in dashed lines), with the windguard tines 204 being pivoted to the pivoted position to act as a rake and remove crop material from the area around the pickup 30. Retaining the windguard 202 in the second position with the windguard retainer 220 provides support for the windguard 202, which allows the windguard tines 204 to be moved, such as pivoted toward the pickup 30, independently of movement of the support arms 201 and be used to clear a blockage from the area around the pickup 30.

The windguard tines 204 may be moved, for example, by the tube 203 being pivotable with respect to the support arms 201 so the tube 203 and the coupled windguard tines 204 are pivotable independently of the support arms 201. The tube 203 may be pivotable independently of the support arms 201 by, for example, mounting the tube 203 on a bushing 205 carried by each support arm 201 or by journaling each end of the tube 203 in a slot formed in the support arms 201. Alternatively, the windguard tines 204 may be pivotable with respect to the tube 203 without the tube 203 being pivotable with respect to the support arms 201 by, for example, forming the windguard tines 204 of a flexible material that can elastically bend when force is applied thereto or by pivotably mounting each of the windguard tines 204 to the tube 203. It should thus be appreciated that the windguard tines 204 may be moved without moving the entirety of the windguard 202 in a large variety of ways according to the present disclosure.

In some embodiments, the feeding assembly 100 includes an actuator 310 that is configured to selectively activate and move at least one of the windguard tines 204 toward, and/or away from, the pickup 30 to clear a crop material blockage. The actuator 310 may, as illustrated, include a movable actuator rod 311 and a bar 312 coupled to the actuator rod 311. As can be appreciated from FIGS. 3 and 4, the bar 312 is configured to bear on at least two of the windguard tines 204 to pivot the at least two windguard tines 204 downwardly. To do this, the actuator rod 311 may be extended to force the bar 312 against the windguard tines 204 and cause the windguard tines 204 to pivot about the second axis of rotation AR2. It should be appreciated that an actuator may be provided to move, e.g., pivot, the windguard tines 204 toward and/or away from the pickup 30 in other ways, e.g., by coupling an actuator directly to one or more of the windguard tines 204 and activating the actuator to pivot the windguard tines 204. The actuator rod 311 can then be retracted to return the windguard tines 204 to the unpivoted position. In some embodiments, the tube 203 and/or at least one of the windguard tines 204 is coupled to a spring 206 that is configured to return the tube 203 and/or the windguard tines 204 to the unpivoted position when the pivoting force acting on the tube 203 and/or the windguard tine(s) 204 is removed. A stop 207 may also be included to ensure the tube 203 and/or the windguard tines 204 do not excessively pivot when returning to the unpivoted position.

In some embodiments, a controller 320 is operatively coupled to the actuator 310 and configured to output signals to the actuator 310 to control function of the actuator 310. As illustrated, the controller 320 may be a baler controller of the baler 10. However, it should be appreciated that, in some embodiments, the controller 320 is carried by a vehicle towing the baler 10, such as a tractor, and/or part of an ISOBUS system that controls various functions of the towing vehicle and/or the baler 10. In some embodiments, the controller 320 is configured to execute a blockage clear protocol, which may begin with the controller 320 outputting a windguard raise signal that causes raising of the windguard 202 to the second position.

The controller 320 may be configured to determine a clearance C between the pickup reel 31 and the windguard 202 in the second position is at least a defined amount. When the controller 320 determines that the clearance C is at least the defined amount, the controller 320 may responsively output an actuation signal to the actuator 310 to activate the actuator 310, e.g., to extend the actuator rod 311, to move at least one of the windguard tines 204 toward and/or away from the pickup 30 to clear a blockage. The controller 320 may determine the clearance C based on signals from one or more position sensors 321, 322 associated with the windguard 202 and/or the pickup reel 31, which may also be movable, and a difference between the positions of the windguard 202 and the pickup reel 31.

If the clearance C between the windguard 202 and the pickup reel 31 is less than the defined amount, the controller 320 may be configured to lockout activation of the actuator 310 until the clearance C is at least the defined amount when the windguard 202 is in the second position. By locking out the actuator 310 when the clearance C is not at least the defined amount, the controller 320 can prevent the pivoted windguard tines 204 from contacting the pickup reel 31 and/or tines 32 while clearing the blockage. In some embodiments, the controller 320 is also configured to output a pickup lower signal to cause lowering of the pickup reel 31 when the clearance C is less than the defined amount and the windguard 202 is in the second position. The pickup lower signal may cause an actuator coupled to the pickup reel 31 to lower the pickup reel 31 further and, if necessary, may also cause the vehicle 10 to adjust so the ground clearance of the vehicle 10 increases to allow further downward movement of the pickup reel 31. After pivoting the windguard tines 204 to clear the blockage, the controller 320 may output signals to cause retraction of the actuator rod 311 and lowering of the windguard 202 from the second position to an operating position, e.g., the first position, for further crop material collection. It should thus be appreciated that the controller 320 may automate some or all of the functions needed to clear out a blockage from the area around the pickup 30 using the windguard tines 204 and then return the windguard 202 to an operating position.

In some embodiments, the windguard retainer 220, and/or the windguard retainer 220A, is movable to engage the windguard 202 and/or disengage from the windguard 202. For example, the windguard retainer 220 may be configured similarly to a latch gate where the windguard retainer 220 latches into engagement with the windguard 202 when the windguard 202 is moved to the second position. To engage the windguard retainer 220 with the windguard 202 or disengage the windguard retainer 220 from the windguard 202, a retainer actuator 240 coupled to the windguard retainer 220 may be selectively activated, by the controller 320 or otherwise, to selectively move the windguard retainer 220 into engagement and/or out of engagement with the windguard 202. The retainer actuator 240 may, for example, be coupled to the hooks 222 and configured to move the hooks 222 toward the tube 203 to engage the tube 203 and/or away from the tube 203 to disengage from the windguard 202. In some embodiments, the retainer actuator 240 moves the windguard retainer 220 in a first direction to engage the windguard 202 in the second position to retain the windguard 202 in the second position and then moves the windguard retainer 220 in a second direction, opposite the first direction, to disengage from the windguard 202 and allow return of the windguard 202 to the first position. The controller 320 may control activation of the windguard retainer 220 so the windguard retainer 220 engages the windguard 202 when the windguard 202 reaches the second position and/or disengages from the windguard 202 after pivoting of the windguard tines 204 to clear a blockage.

From the foregoing, it should be appreciated that the feeding assembly 100 provided according to the present disclosure includes a windguard retainer 220, 220A that can retain the windguard 202 in an elevated second position. The windguard 202 being in the elevated second position can maintain an increased clearance between the windguard 202 and the pickup reel 31, which may help with removing crop material blockages around the pickup 30. In some embodiments, the windguard tines 204 can be moved, without moving the entirety of the windguard 202, toward and/or away from the pickup 30 to remove a crop material blockage, providing additional functionality to the windguard tines 204 and allowing an operator to clear crop material blockages without having to manually remove the crop material blockage. Thus, the feeding assembly 100 provided according to the present disclosure can reduce the risk of an operator getting injured while clearing crop material blockages around the pickup 30 and also provides a convenient way for an operator to clear crop material blockages without having to leave an operator cabin of a vehicle.

Figure 5:
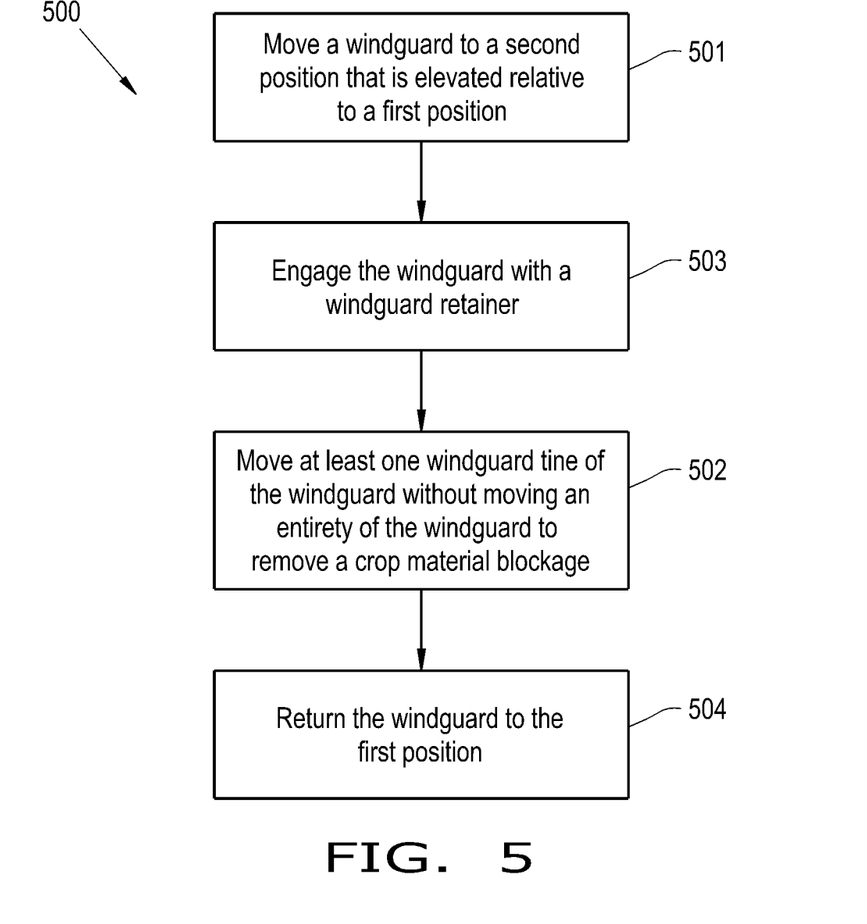
FIG. 5 is a flow chart illustrating an exemplary embodiment of adjusting a windguard of an agricultural vehicle, provided in accordance with the present disclosure.

Referring now to FIG. 5, an exemplary embodiment of a method 500 of adjusting the windguard 202 of the agricultural vehicle 10 provided according to the present disclosure is illustrated. The method 500 includes moving 501 the windguard 202 to the second position, which is elevated relative to the first position, and moving 502 at least one windguard tine 204 of the windguard 202 without moving the entirety of the windguard 202 to remove a crop material blockage from an area around the pickup 30, as previously described. The windguard tine(s) 204 may be moved, for example, by pivoting the windguard tine(s) 204 toward and/or away from the pickup 30. In some embodiments, the windguard 202 is engaged 503 with the windguard retainer 220, 220A when the windguard 202 is in the second position, prior to moving 502 the windguard tine(s) 204, to support the windguard 202 while moving 502 the windguard tine(s) 204. After moving 502 the windguard tine(s) 204 to remove the crop material blockage, the windguard 202 may be returned 504 to the first position, which may be a collection position, so operation of the vehicle 10 may resume as normal.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

The invention claimed is:

1. A feeding assembly for an agricultural vehicle, comprising:
   a pickup comprising a pickup reel carrying a plurality of tines;
   a rotor comprising a plurality of rotor fins disposed rearwardly from the pickup;
   a windguard assembly comprising a pair of movable support arms and a windguard coupled to the support arms, the windguard comprising a tube and a plurality of windguard tines coupled to the tube, the windguard being movable from a first position to a second position that is elevated relative to the first position; and
   a windguard retainer configured to engage the windguard when the windguard is in the second position and retain the windguard in the second position, and wherein the windguard retainer is disengaged from the windguard when the windguard is in the first position such that the windguard retainer does not retain the windguard in the first position; and
   a windguard retainer actuator that is configured to move the windguard retainer between (i) a first windguard retainer position in which the windguard retainer is engaged with the windguard while the windguard is maintained in the second position and (ii) a second windguard retainer position in which the windguard retainer is disengaged from the windguard.

2. The feeding assembly of claim 1, wherein the windguard tines are configured to move without moving an entirety of the windguard while the windguard is in the second position.

3. The feeding assembly of claim 2, wherein the support arms are pivotable about a first axis of rotation and the windguard tines are pivotable about a second axis of rotation that is non-coaxial with the first axis of rotation, the windguard tines being configured to pivot at least one of toward or away from the pickup to dislodge a crop material blockage.

4. The feeding assembly of claim 1, further comprising an a windguard tine actuator configured to selectively activate and pivot at least one of the windguard tines without moving the entirety of the windguard.

5. A feeding assembly for an agricultural vehicle, comprising:
   a pickup comprising a pickup reel carrying a plurality of tines;
   a rotor comprising a plurality of rotor fins disposed rearwardly from the pickup;
   a windguard assembly comprising a pair of movable support arms and a windguard coupled to the support arms, the windguard comprising a tube and a plurality of windguard tines coupled to the tube, the windguard being movable from a first position to a second position that is elevated relative to the first position;
   a windguard retainer configured to engage the windguard when the windguard is in the second position and retain the windguard in the second position;
   an actuator configured to selectively activate and pivot at least one of the windguard tines without moving the entirety of the windguard; and
   a controller operatively coupled to the actuator and configured to:
      determine a clearance between the pickup reel and the windguard in the second position is at least a defined amount; and
      output an actuation signal to the actuator to activate the actuator to pivot the at least one windguard tine responsively to determining the clearance is at least the defined amount.

6. The feeding assembly of claim 5, wherein the controller is configured to lockout activation of the actuator until the clearance is at least the defined amount while the windguard is in the second position.

7. The feeding assembly of claim 4, wherein the windguard tine actuator comprises a movable actuator rod and a bar coupled to the actuator rod and configured to bear on at least two of the windguard tines to move the at least two windguard tines.

8. The feeding assembly of claim 1, wherein the windguard retainer is configured to engage the tube to retain the windguard in the second position.

9. The feeding assembly of claim 1, wherein the windguard retainer is configured to engage at least one of the support arms when the windguard is in the second position to retain the windguard in the second position.

10. The feeding assembly of claim 1, wherein the windguard retainer is movable to at least one of engage the windguard or disengage from the windguard.

11. An agricultural vehicle, comprising:
    a chassis;
    a pickup carried by the chassis and comprising a pickup reel carrying a plurality of tines;
    a rotor comprising a plurality of rotor fins disposed rearwardly from the pickup;

a windguard assembly comprising a pair of movable support arms and a windguard coupled to the support arms, the windguard comprising a tube and a plurality of windguard tines coupled to the tube, the windguard being movable from a first position to a second position that is elevated relative to the first position;

a windguard retainer configured to engage the windguard when the windguard is in the second position and retain the windguard in the second position, wherein the windguard retainer is disengaged from the windguard when the windguard is in the first position such that the windguard retainer does not retain the windguard in the first position; and a windguard retainer actuator that is configured to move the windguard retainer between (i) a first windguard retainer position in which the windguard retainer is engaged with the windguard while the windguard is maintained in the second position and (ii) a second windguard retainer position in which the windguard retainer is disengaged from the windguard.

12. The agricultural vehicle of claim 11, wherein the windguard tines are configured to move without moving an entirety of the windguard while the windguard is in the second position.

13. The agricultural vehicle of claim 12, wherein the support arms are pivotable about a first axis of rotation and the windguard tines are pivotable about a second axis of rotation that is non-coaxial with the first axis of rotation, the windguard tines being configured to be moved toward and away from the pickup to dislodge a crop material blockage.

14. The agricultural vehicle of claim 11, further comprising a windguard tine actuator configured to selectively activate and pivot at least one of the windguard tines without moving the entirety of the windguard.

15. The agricultural vehicle of claim 14, further comprising a controller operatively coupled to the windguard tine actuator and configured to:
  determine a clearance between the pickup reel and the windguard in the second position is at least a defined amount; and
  output an actuation signal to the windguard tine actuator to activate the windguard tine actuator to pivot the at least one windguard tine responsively to determining the clearance is at least the defined amount.

16. The agricultural vehicle of claim 15, wherein the controller is configured to lockout activation of the actuator until the clearance is at least the defined amount while the windguard is in the second position.

17. The agricultural vehicle of claim 14, wherein the windguard tine actuator comprises a movable actuator rod and a bar coupled to the actuator rod and configured to bear on at least two of the windguard tines to move the at least two windguard tines.

18. The agricultural vehicle of claim 11, wherein the windguard retainer is configured to engage the tube to retain the windguard in the second position.

19. The agricultural vehicle of claim 11, wherein the windguard retainer is configured to engage at least one of the support arms when the windguard is in the second position to retain the windguard in the second position.

20. The agricultural vehicle of claim 11, wherein the windguard retainer is movable to at least one of engage the windguard or disengage from the windguard.

21. The feeding assembly of claim 1, wherein the windguard retainer is configured to retain the windguard in the second position and prevent the windguard from returning to the first position.

* * * * *